US 11,571,669 B2

United States Patent
Liu et al.

(10) Patent No.: US 11,571,669 B2
(45) Date of Patent: Feb. 7, 2023

(54) METHOD FOR DETERMINING MIXING TEMPERATURE OF ASPHALT MIXTURE BASED ON SURFACE ENERGY THEORY

(71) Applicant: Tongji University, Shanghai (CN)

(72) Inventors: Liping Liu, Shanghai (CN); Lijun Sun, Shanghai (CN); Qingbing Lu, Shanghai (CN); Mingchen Li, Shanghai (CN)

(73) Assignee: Tongji University, Shanghai (CN)

( * ) Notice: Subject to any disclaimer, the term of this patent is extended or adjusted under 35 U.S.C. 154(b) by 125 days.

(21) Appl. No.: 17/345,212

(22) Filed: Jun. 11, 2021

(65) Prior Publication Data

US 2021/0402360 A1 Dec. 30, 2021

(30) Foreign Application Priority Data

Jun. 24, 2020 (CN) .......................... 202010590088.2

(51) Int. Cl.
*B01F 35/21* (2022.01)
*B01F 35/213* (2022.01)
*C08L 95/00* (2006.01)
*G01N 21/84* (2006.01)

(52) U.S. Cl.
CPC ............ *B01F 35/213* (2022.01); *C08L 95/00* (2013.01); *G01N 21/84* (2013.01); *C08L 2555/10* (2013.01); *C08L 2555/22* (2013.01); *G01N 2021/8405* (2013.01)

(58) Field of Classification Search
CPC .... B01F 35/213; C08L 95/00; C08L 2555/10; C08L 2555/22; G01N 21/84; G01N 2021/8405; G01K 11/00; G01K 13/12
See application file for complete search history.

(56) References Cited

U.S. PATENT DOCUMENTS

| | | | | |
|---|---|---|---|---|
| 2016/0002465 A1* | 1/2016 | McDade | ................. | C08L 95/00 106/277 |
| 2019/0161615 A1* | 5/2019 | Moriyasu | ................. | C08K 3/22 |
| 2019/0233647 A1* | 8/2019 | Takahashi | ............... | C08L 95/00 |
| 2021/0114932 A1* | 4/2021 | Liu | .......................... | E01C 7/182 |
| 2021/0402360 A1* | 12/2021 | Liu | .......................... | C08L 95/00 |
| 2022/0357308 A1* | 11/2022 | Luo | .......................... | G06F 17/11 |

FOREIGN PATENT DOCUMENTS

| | | | | | |
|---|---|---|---|---|---|
| CN | 105842121 A | * | 8/2016 | ............. | G01N 13/00 |
| CN | 111855497 A | * | 10/2020 | | |
| CN | 111855498 A | * | 10/2020 | ........ | B01F 15/00207 |

OTHER PUBLICATIONS

CN-112816366 A, Luo et al., May 18, 2021.*

* cited by examiner

*Primary Examiner* — Ellen M McAvoy
(74) *Attorney, Agent, or Firm* — Greenberg Traurig, LLP; Peigan Jiang; David J. Dykeman (57) ABSTRACT

Disclosed is a method for determining a mixing temperature of an asphalt mixture which includes the following steps: S100, obtaining a test result of surface energy of hot-melt asphalt; S200, obtaining, according to a calculation formula for total adhesion work and in combination with the test result of the surface energy of the hot-melt asphalt, total adhesion work of an asphalt and aggregate interface at different mixing temperatures; S300, determining a temperature range corresponding to peak values of the total adhesion work of the asphalt and aggregate interface; and S400, calculating a median value of the temperature range determined in S300, so as to determine an optimum mixing temperature of the asphalt mixture.

12 Claims, 7 Drawing Sheets

METHOD FOR DETERMINING MIXING TEMPERATURE OF ASPHALT MIXTURE BASED ON SURFACE ENERGY THEORY

CROSS REFERENCE TO RELATED APPLICATION(S)

This patent application claims the benefit and priority of Chinese Patent Application No. 202010590088.2, filed on Jun. 24, 2020, the disclosure of which is incorporated by reference herein in its entirety as part of the present application.

TECHNICAL FIELD

The present disclosure relates to the technical field of parameter measurement of an asphalt mixture, and particularly relates to a method for determining a mixing temperature of an asphalt mixture based on a surface energy theory.

BACKGROUND ART

Mixing temperature is an important parameter in a mixing process of hot mixture asphalt (HMA). It can influence the adhesion of an asphalt-aggregate interface of a mixed system to a certain extent. To be more specific, the aging of an asphalt binder is intensified in the mixing process if the mixing temperature is too high, whereas the fluidity of the asphalt is influenced if the mixing temperature is too low. As a result, the surface of an aggregate cannot be uniformly coated with the asphalt and later paving and compacting are also influenced. Generally, the HMA mixing temperature is determined, from the perspective of workability and aging of the asphalt binder in the construction process of the mixture, according to engineering experience or a viscosity-temperature curve of the matrix asphalt used in the mixture. The construction temperature of the modified asphalt mixture is usually 10-20° C. higher than that of the matrix asphalt mixture.

SUMMARY

To this end, the present disclosure provides a method for determining a mixing temperature of an asphalt mixture based on a surface energy theory, so as to solve the problem that in the prior art, the mixing temperature of the asphalt mixture, obtained according to engineering experience or a viscosity-temperature curve of matrix asphalt used in the mixture, may not reflect the adhesiveness of asphalt and an aggregate.

To achieve the above objective, the present disclosure provides the following technical solution:

in a first aspect of the present disclosure, a method for determining a mixing temperature of an asphalt mixture based on a surface energy theory includes the following steps: S100, obtaining a test result of surface energy of hot-melt asphalt; S200, obtaining, according to a calculation formula for adhesion work and in combination with the test result of the surface energy of the hot-melt asphalt, adhesion work of an asphalt and aggregate interface at different mixing temperatures; S300, determining a temperature range corresponding to peak values of the adhesion work of the asphalt and aggregate interface; and S400, calculating a median value of the temperature range determined in S300, so as to determine an optimum mixing temperature of the asphalt mixture.

Further, the obtaining a test result of a surface energy parameter of hot-melt asphalt in S100 may include the following steps:

S110, obtaining a contact angle between the hot-melt asphalt to be tested and each of three known aggregates; and S120, solving a linear equation set to obtain the surface energy of the hot-melt asphalt, $$\begin{bmatrix} \sqrt{\gamma_{s_1}^{LW}} & \sqrt{\gamma_{s_1}^+} & \sqrt{\gamma_{s_1}^-} \\ \sqrt{\gamma_{s_2}^{LW}} & \sqrt{\gamma_{s_2}^+} & \sqrt{\gamma_{s_2}^-} \\ \sqrt{\gamma_{s_3}^{LW}} & \sqrt{\gamma_{s_3}^+} & \sqrt{\gamma_{s_3}^-} \end{bmatrix} \begin{bmatrix} \sqrt{\gamma_a^{LW}} \\ \sqrt{\gamma_a^-} \\ \sqrt{\gamma_a^+} \end{bmatrix} = \begin{bmatrix} \frac{\gamma_a(1+\cos\theta_1)}{2} \\ \frac{\gamma_a(1+\cos\theta_2)}{2} \\ \frac{\gamma_a(1+\cos\theta_3)}{2} \end{bmatrix}$$

$$\gamma_a = \gamma_a^{LW} + 2\sqrt{\gamma_a^+ \gamma_a^-}$$

where $\gamma_s$ and $\gamma_l$ represent surface energy of solid and surface energy of liquid respectively, in unit of mJ·m$^{-2}$; $\gamma_{sl}$ represents solid-liquid interfacial energy, in unit of mJ·m$^{-2}$; s represents the known aggregate; a represents the hot-melt asphalt to be tested; θ represents the contact angle between the hot-melt asphalt to be tested and the known aggregate; and 1, 2, 3 represent the three known aggregates respectively.

Further, the step S110 of obtaining a contact angle between the hot-melt asphalt to be tested and each of three known aggregates may specifically include:

S111, selecting and conveying a coarse aggregate with known surface energy and a regular shape to a stone cutting factory, carrying out double-side cutting on a stone by using a water saw to obtain a small stone with a flat surface, and controlling a thickness of the small stone;

S112, washing the cut small stone with clear water, and airing and polishing the small stone with waterproof abrasive paper to obtain a flat and smooth surface;

S113, soaking the stone with distilled water for 5 hours, and repeatedly washing the small stone 2-3 times to remove stains on the surface and in micropores of the stone; and putting the stone into a drying oven at 175° C. for drying for 5 hours, taking out the stone, and cooling to normal temperature in a dry environment to obtain a dry, clean and flat-surfaced small stone chip sample;

S114, heating the asphalt to be tested to a hot melt state, using an injector to suck 8 ml of the asphalt to be tested, and using cloth to wipe the asphalt from an injection suction nozzle and a pipe wall; and carrying out heat preservation on the asphalt sample and the known aggregate for 2 hours according to a temperature required by a test in a clean oven with accurate temperature control;

S115, starting a contact angle instrument and a matched software system, adjusting a needle tube of a liquid dropper to a proper position, so as to drip liquid in a center of a field of view of a high-power camera; rotating a knob at an upper part of the liquid dropper to drip a drop of liquid onto a stage, and adjusting brightness of a light source, a position of the stage and a focal length of the high-power camera to obtain the highest definition of a collected liquid contour image; and finally, using clean and dry cloth to wipe the liquid drop from the stage, and lowering the stage;

S116, taking out the asphalt sample to be tested from the oven, quickly placing the asphalt sample at the liquid dropper of the contact angle instrument, meanwhile, placing the small aggregate stone chip on the stage, slowly pushing a piston handle of the injector to drip the asphalt to be tested to the surface of aggregate, under the conditions that a liquid drop contour image is in the center of the field of view of the high-power camera, a shape is clear, and a liquid drop contour is obvious, quickly collecting the image, and if not, abandoning the test, and restarting; and S117, carrying out solid-liquid contact angle analysis by means of the matched software system to obtain contact angles, taking a mean value of a left contact angle and a right contact angle of the liquid drop contour image as a test result of each time, carrying out three times of parallel tests on each aggregate, and taking a mean value as a final result.

Further, the thickness of the small stone in S111 may be controlled between 2 mm and 4 mm.

Further, 240-mesh waterproof abrasive paper may be used in S112.

Further, the injector in S114 may be made of high temperature resistant glass.

Further, a lowered distance of the stage in S115 may be the thickness of the small stone.

Further, the test process in S116 may not be longer than 10 s in total; otherwise, the test may be abandoned, and need to be restarted.

Further, in S117, the contact angle may be obtained through a tangent method.

Further, the three known aggregates may be limestone, basalt and granite, and a temperature gradient in a specific experiment for obtaining the contact angles between the hot-melt asphalt to be tested and the known aggregates may be 20° C.

The present disclosure has the following advantages: the method for determining a mixing temperature of an asphalt mixture based on a surface energy theory in the present disclosure more scientifically determines the mixing temperature of the asphalt mixture while avoiding the problem that the mixing temperature of the asphalt mixture, obtained according to engineering experience or a viscosity-temperature curve of matrix asphalt used in the mixture, may not reflect the adhesiveness of asphalt and an aggregate.

BRIEF DESCRIPTION OF THE DRAWINGS

In order to more clearly illustrate the implementations of the present disclosure or the technical solutions in the prior art, a brief introduction to the accompanying drawings required for the description of the implementations or the prior art will be provided below. Obviously, the drawings in the following description are only exemplary. For those of ordinary skill in the art, other implementation drawings can be derived from the provided drawings without creative work.

The structure, scale, size, etc. shown in the drawings of this specification are only used to match the content disclosed in the specification and for those skilled in the art to understand and read, instead of being used to limit the limitations for implementing the present disclosure, and thus they are not technically substantial. Any structural modification, scale relation change, or size adjustment made without affecting the effects and objectives that can be achieved by the present disclosure shall fall within the scope that can be encompassed by the technical content disclosed in the present disclosure.

DETAILED DESCRIPTION OF THE EMBODIMENTS

The implementation of the present disclosure will be illustrated below in conjunction with specific embodiments. Those skilled in the art can easily understand other advantages and effects of the present disclosure from the content disclosed in this specification. Obviously, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
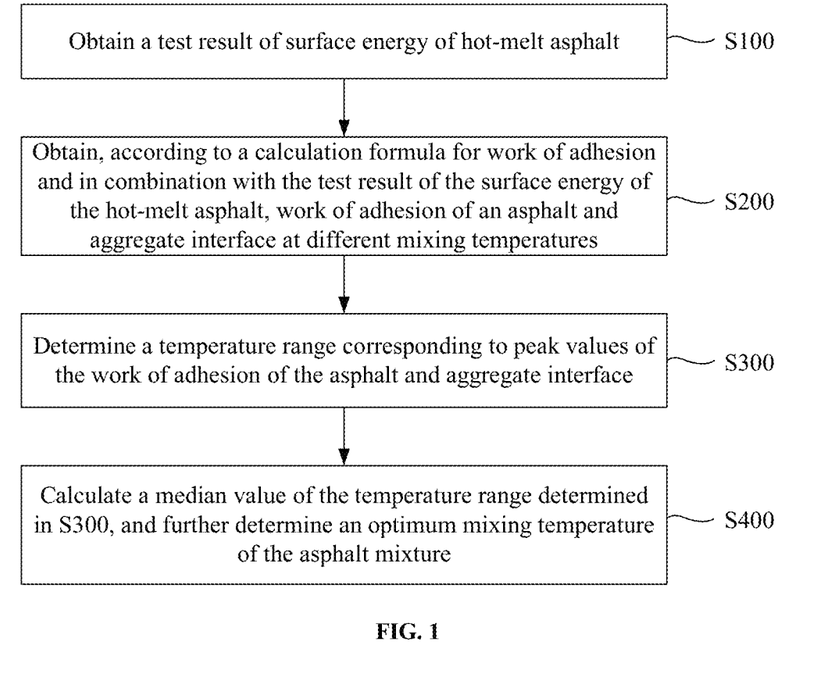
FIG. 1 is a flow diagram of a method for determining a mixing temperature of an asphalt mixture based on a surface energy theory provided in some embodiments of the present disclosure.

As shown in FIG. 1, a method for determining a mixing temperature of an asphalt mixture based on a surface energy theory in this embodiment includes the following steps: S100, a test result of surface energy of hot-melt asphalt is obtained; S200, according to a calculation formula for adhesion work and in combination with the test result of the surface energy of the hot-melt asphalt, adhesion work of an asphalt and aggregate interface at different mixing temperatures is obtained; S300, a temperature range corresponding to peak values of the adhesion work of the asphalt and aggregate interface is determined; and S400, a median value of the temperature range determined in S300 is calculated, so as to determine an optimum mixing temperature of the asphalt mixture.

This embodiment achieves the technical effects that the method for determining a mixing temperature of an asphalt mixture based on a surface energy theory in this embodiment more scientifically determines the mixing temperature of the asphalt mixture while avoiding the problem that the mixing temperature of the asphalt mixture, obtained according to engineering experience or a viscosity-temperature curve of matrix asphalt used in the mixture, may not reflect the adhesiveness of asphalt and an aggregate.

According to the adhesion work calculation formula and in combination with the test result of the surface energy of the hot-melt asphalt, the adhesion work of the asphalt and an aggregate at different mixing temperatures may be obtained; and thus, the present embodiment seeks to determine the optimum mixing temperature from the perspective of adhesion work of a mixing system during mixing and compares it with an optimum mixing temperature determined by a viscosity-temperature curve.

Figure 2:
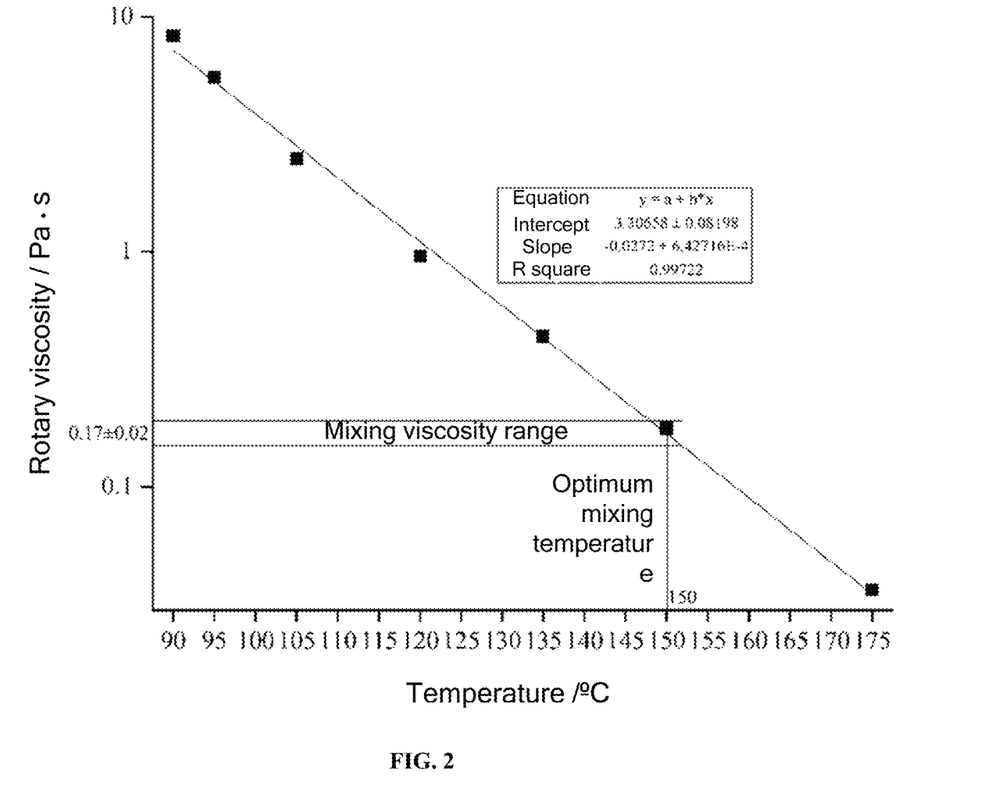
FIG. 2 is a viscosity-temperature curve graph of asphalt 70#.

Firstly, Brookfield rotary viscosity tests are carried out on asphalt 70# for this research under different temperature conditions to obtain the viscosity-temperature curve, and it is determined that the optimum mixing temperature of the asphalt 70# is about 150° C. according to a temperature corresponding to rotary viscosity of 0.17±0.02 Pa·s, as shown in FIG. 2.

Figure 3:
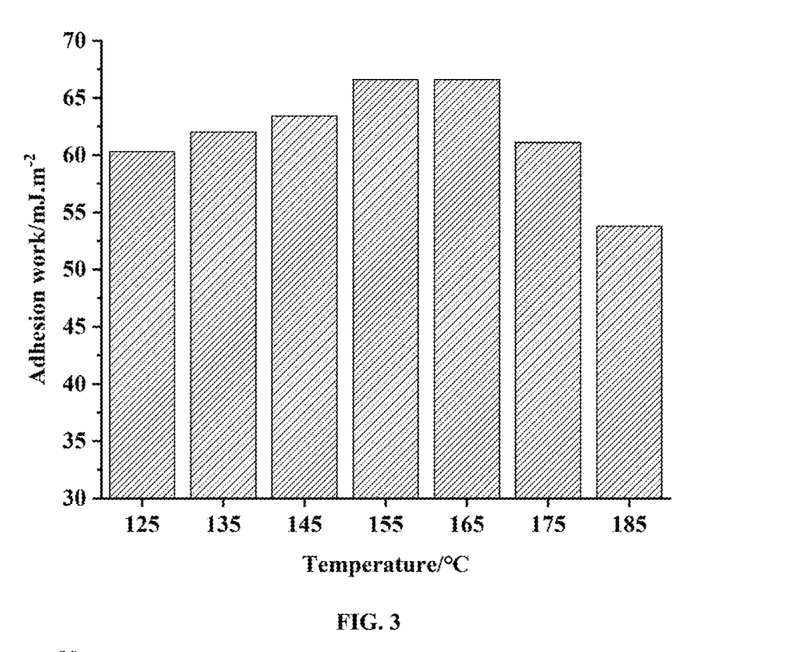
FIG. 3 is a $W_{as}$ graph of adhesion work of an asphalt 70#-aggregate interface at different temperatures in the method for determining a mixing temperature of an asphalt mixture based on a surface energy theory provided in some embodiments of the present disclosure.
Figure 4:
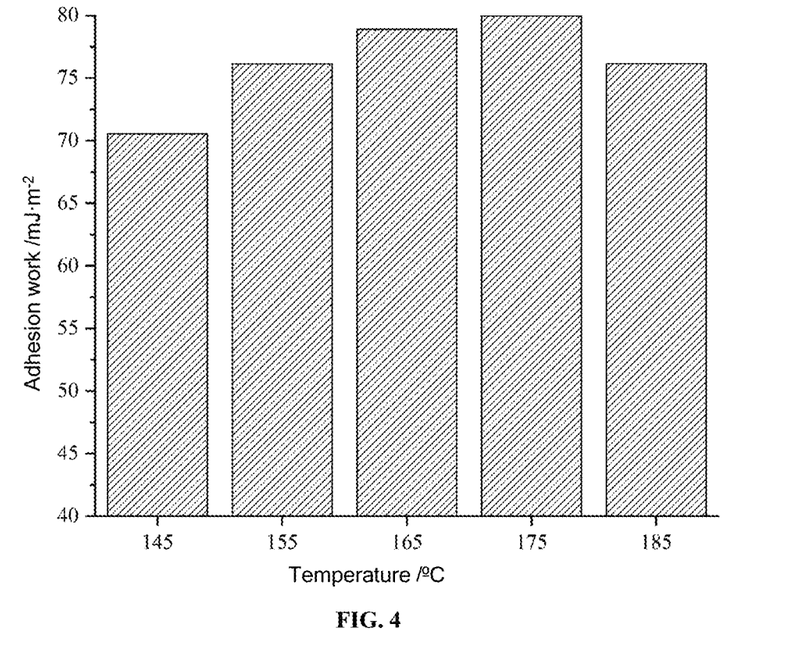
FIG. 4 is a $W_{as}$ graph of adhesion work of an SBS-modified asphalt-aggregate interface at different temperatures in the method for determining a mixing temperature of an asphalt mixture based on a surface energy theory provided in some embodiments of the present disclosure.

Secondly, according to test results of the surface energy of the hot-melt asphalt and the aggregate at different temperatures, the adhesion work of the asphalt-aggregate interface at different temperatures may be obtained as shown in FIGS. 3 and 4.

As shown in FIGS. 3 and 4, the adhesion work of the asphalt-aggregate interface tends to be increased and decreased in a certain temperature range, which shows that the mixing temperature has a certain influence on the adhesion effect of the asphalt-aggregate interface, a peak value of the adhesion work of the asphalt 70#-aggregate interface appears in a temperature range of 155-165° C. with the median value being 160° C., and a peak value of the adhesion work of an SBS-modified asphalt-aggregate interface appears around 175° C. The optimum mixing temperature, determined according to the viscosity-temperature curve of the asphalt 70# shown in FIG. 2, of the asphalt 70# is about 150° C., which is about 10° C. lower than the optimum mixing temperature determined based on the adhesion work of the surface energy theory. Therefore, the optimum mixing temperature determined according to an existing method for determining a mixing temperature of common hot mixture asphalt (HMA), that is, a viscosity-temperature curve method, is slightly lower for guaranteeing the adhesion effect of the asphalt-aggregate interface in a mixing stage. Thus, during determining the optimal mixing temperature of the common HMA, the influence of the mixing temperature on the adhesion effect of the asphalt-aggregate interface should be considered in addition to construction workability and an asphalt binder aging property.

For verifying analysis results of the adhesion work of the asphalt-aggregate interface at different temperatures based on a surface energy theory, the AC-20 (asphalt concrete with nominal maximum particle size of 20 mm) type hot mixture asphalt (HMA) of two types of asphalt is mixed at different mixing temperatures, and forms corresponding test pieces, and performance of the AC-20 HMA at different mixing temperatures are obtained as shown in Tables 1 and 2.

TABLE 1

Performance comparison of AC-20 HMA at different mixing temperatures (asphalt 70#)

| Mixing temperature/° C. | VV/% | DS/time · mm$^{-1}$ | Work of rupture/ N · m | TSR/% |
| --- | --- | --- | --- | --- |
| 150 | 4.06 (2.7) | 1499 (4.5) | 25.4 (4.7) | 76.7 (5.5) |
| 160 | 4.10 (1.9) | 1519 (5.6) | 26.8 (4.1) | 83.5 (3.9) |
| 170 | 4.08 (3.8) | 1528 (3.1) | 25.9 (2.8) | 79.4 (4.9) |

Note:
Numbers in parentheses in the table are coefficient of variation (CV), %.

TABLE 2

Performance comparison of AC-20 HMA at different mixing temperature (SBS-modified asphalt)

| Mixing temperature/° C. | VV/% | DS/time · mm$^{-1}$ | Work of rupture/ N · m | TSR/% |
| --- | --- | --- | --- | --- |
| 165 | 3.97 (2.1) | 3615 (3.1) | 40.5 (4.5) | 87.4 (3.9) |
| 175 | 3.93 (4.1) | 3681 (3.2) | 41.2 (2.8) | 92.5 (1.8) |
| 185 | 4.00 (3.8) | 3584 (2.1) | 39.4 (3.7) | 89.7 (2.8) |

Note:
Number in parentheses in the table are coefficient of variation (CV), %.

According to results of performance comparison of the AC-20 HMA at different mixing temperatures in Tables 1 and 2, the change of the mixing temperature does not have obvious influence on volume, high-temperature performance and low-temperature performance, but has obvious influence on water stability, the water stability of the AC-20 HMA of the asphalt 70# and the SBS-modified asphalt is excellent at the mixing temperatures of 160° C. and 175° C. respectively, which is basically consistent with analysis results of the adhesion work of the asphalt-aggregate interface at different temperatures based on the surface energy theory in FIGS. 3 and 4, it shows that the mixing temperature influences the water stability of the mixture by influencing the adhesion effect of the asphalt-aggregate interface, and the water stability of the asphalt mixture is adversely influenced by too high or too low mixing temperature.

In this embodiment, it should be noted that the adhesion work in a broad sense refers to the work done by an external force separating an adhesion interface per unit area after two materials make contact with each other and adhere to each other, which is expressed as $W_{as}$, and also dimensioned as mJ·m$^{-2}$. The relative magnitude of the adhesion work $W_{as}$ reflects the adhesion effect of the adhesion interface of two materials, that is, it is considered that the larger the $W_{as}$ is, the better the adhesion effect is, and otherwise, the worse the adhesion effect is.

According to a thermodynamic viewpoint, any solid surface has a tendency of spontaneously attracting other substances to reduce free energy due to the presence of an unsaturated force field, and as for adhesion of asphalt and an aggregate, when hot-melt asphalt is diffused and wets a surface of the aggregate, the surface of the aggregate spontaneously attracts asphalt molecules to reduce the free energy of a system, thereby generating a new interface, that is, the adhesion effect, the adhesion between the asphalt and the aggregate is considered to be a result of energy exchange, and the energy change amount of the adhesion interface per unit area generated accordingly is the adhesion work $W_{as}$. According to a thermodynamic definition, $W_{as}$ may be calculated as follows: $w_{as}=\gamma_a+\gamma_s-\gamma_{as}$, where $W_{as}$ is the adhesion work, in unit of mJ·m$^{-2}$; $\gamma_a$ represents surface energy of the asphalt, in unit of mJ·m$^{-2}$; $\gamma_s$ represents surface energy of the aggregate, in unit of mJ·m$^{-2}$; $\gamma_{as}$ represents interfacial energy of an asphalt-aggregate adhesion interface, in unit of mJ·m$^{-2}$; s represents the aggregate (stone); and the remaining symbols have the same meaning as above.

In order to obtain the numerical value of the adhesion work $W_{as}$ of the asphalt-aggregate interface, it is critical that 1, the surface energy of the asphalt and the aggregate is obtained; and 2, a suitable expression is sought to calculate a numerical value of the interfacial energy $\gamma_{as}$. According to different surface energy theoretical models, different calculation formulas of $\gamma_{as}$ may be obtained, a corresponding calculation method and thought of $W_{as}$ are different, and as an LW-AB model is selected herein, an LW-AB model-based calculation formula of the adhesion work $W_{as}$ may be obtained: $w_{as}=2\sqrt{\gamma_s^{LW}\gamma_a^{LW}}+2\sqrt{\gamma_s^+\gamma_a^-}+2\sqrt{\gamma_s^-\gamma_a^+}$, where each symbol has the same meaning as above.

The formula $w_{as}=\gamma_a+\gamma_s-\gamma_{as}$ may be combined with a Young equation describing a quantitative relation among the solid-liquid interfacial energy, the solid surface energy and the liquid surface energy to obtain another calculation method of the adhesion work $W_{as}$, which is shown as follows: $w_{as}=\gamma_a(1+\cos\theta)$, where $\theta$ is a contact angle of liquid on a solid surface, and for an asphalt aggregate system, it is a contact angle of the hot-melt asphalt on the surface of the aggregate, °; and the remaining symbols have the same meaning as above.

The calculation formula of the adhesion power $W_{as}$ of $w_{as}=\gamma_a(1+\cos\theta)$ only includes two unknown parameters: the contact angle $\theta$ of the hot-melt asphalt on the surface of the high-temperature aggregate and the surface energy $\gamma_a$ of the hot-melt asphalt, since the surface energy parameter of the aggregate is not directly involved in calculation and only reflected by the contact angle $\theta$ of the hot-melt asphalt on the surface of the high-temperature aggregate, a calculation result, obtained by the calculation method, of the adhesion work often has large deviation from an actual value, and accordingly, the method is rarely applied to existing researches.

Adhesion work $W_{as}$ refers to the energy change amount when an adhesion interface per unit area is formed, the magnitude of which depends on the surface energy parameters of both, a larger $W_{as}$ value indicates that an adhesion process occurs more easily, and a specific surface area (SSA) indicates a total surface area of solid particle per unit mass, which reflects the thickness of solid particles. This research introduces a new index $\Delta G$ on the basis of the adhesion work: $\Delta G=SSA\cdot w_{as}$, where $\Delta G$ is total adhesion work, mJ·Kg$^{-1}$; SSA represents the specific surface area of a solid particulate material; $W_{as}$ represents adhesion work, mJ·m$^{-2}$; the remaining symbols have the same meaning as above; and the physical meaning is the total energy change amount in the adhesion process of the solid particle material per unit mass with the specific particle size specification and the liquid, which is defined as the total adhesion work herein and represents the difficulty degree of adhesion between the solid particle material with the specific particle size specification and the liquid.

Embodiment 2

Figure 5:
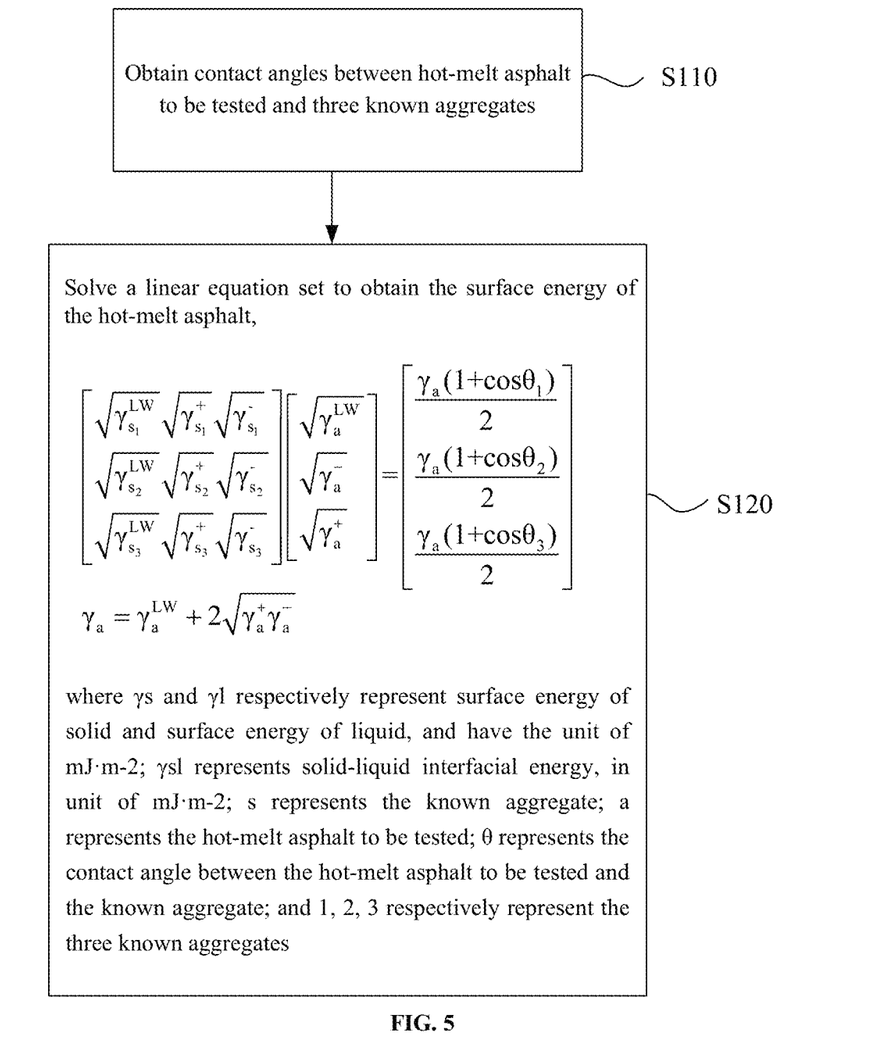
FIG. 5 is a cross-sectional flow diagram of a test method of a surface energy parameter of hot-melt asphalt in the method for determining a mixing temperature of an asphalt mixture based on a surface energy theory provided in some embodiments of the present disclosure.

As shown in FIGS. 1 and 5, the method for determining a mixing temperature of an asphalt mixture based on a surface energy theory in the embodiment may include all the technical features in Embodiment 1, and in addition, S100 in which a test method of a surface energy parameter of hot-melt asphalt is obtained may include the following steps:

S110, contact angles between hot-melt asphalt to be tested and three known aggregates are obtained; and S120, a linear equation set is solved to obtain the surface energy of the hot-melt asphalt, $$\begin{bmatrix} \sqrt{\gamma_{s_1}^{LW}} & \sqrt{\gamma_{s_1}^+} & \sqrt{\gamma_{s_1}^-} \\ \sqrt{\gamma_{s_2}^{LW}} & \sqrt{\gamma_{s_2}^+} & \sqrt{\gamma_{s_2}^-} \\ \sqrt{\gamma_{s_3}^{LW}} & \sqrt{\gamma_{s_3}^+} & \sqrt{\gamma_{s_3}^-} \end{bmatrix} \begin{bmatrix} \sqrt{\gamma_a^{LW}} \\ \sqrt{\gamma_a^-} \\ \sqrt{\gamma_a^+} \end{bmatrix} = \begin{bmatrix} \frac{\gamma_a(1+\cos\theta_1)}{2} \\ \frac{\gamma_a(1+\cos\theta_2)}{2} \\ \frac{\gamma_a(1+\cos\theta_3)}{2} \end{bmatrix}$$

$$\gamma_a = \gamma_a^{LW} + 2\sqrt{\gamma_a^+\gamma_a^-}$$

where $\gamma_s$ and $\gamma_l$ represent surface energy of solid and surface energy of liquid respectively, in unit of mJ·m$^{-2}$; $\gamma_{sl}$ represents solid-liquid interfacial energy, in unit of mJ·m$^{-2}$; s represents the known aggregate; a represents the hot-melt asphalt to be tested; $\theta$ represents the contact angle between the hot-melt asphalt to be tested and the known aggregate; and 1, 2, 3 represent the three known aggregates respectively.

As the above equation set is not a conventional ternary primary linear equation set, and compared with a solving equation (ternary primary linear equation set) of a conventional sessile drop method of solid asphalt, a solving process of the surface energy of the hot-melt asphalt is more complex, and usually needs related data analysis software, for example, Matlab, etc.

This embodiment achieves the technical effects that the method for determining a mixing temperature of an asphalt mixture based on a surface energy theory in this embodiment fills up a blank in the field of determining the mixing temperature of the asphalt mixture based on the surface energy theory, which may rapidly and accurately obtains the mixing temperature of the asphalt mixture.

Embodiment 3

As shown in FIGS. 1 and 5, the method for determining a mixing temperature of an asphalt mixture based on a surface energy theory in the embodiment may include all the technical features in Embodiment 2, and in addition, specific experimental steps of S110 that contact angles between hot-melt asphalt to be tested and three known aggregates are obtained may include the following steps:

S111, a small stone chip with a flat surface is obtained, where a coarse aggregate with known surface energy and a regular shape is selected and conveyed to a stone cutting factory, double-side cutting is carried out on a stone by using a water saw to obtain a small stone with a flat surface, and a thickness of the small stone is controlled;

S112, the small stone chip is polished to obtain a flat and smooth surface, where the cut small stone is washed with clear water, then aired, and finally polished with waterproof abrasive paper to obtain a flat and smooth surface;

S113, the surface of the small stone chip is cleaned, where the stone is soaked with distilled water for 5 hours, and the small stone is repeatedly washed 2-3 times to remove stains on the surface and in micropores; and the stone is put into a drying oven at 175° C. for drying for 5 hours, then taken out, and cooled to the normal temperature in a dry environment to obtain a dry, clean and flat-surfaced small stone chip sample;

S114, heat preservation is carried out on an asphalt sample to be tested and the known aggregate, where the asphalt to be tested is heated to a hot melt state, an injector is used to suck 8 ml of the asphalt to be tested, and cloth is used to wipe the asphalt from an injection suction nozzle and a pipe wall; and heat preservation is carried out on the asphalt sample and the known aggregate for 2 hours according to a temperature required by a test in a clean oven with accurate temperature control, that is, the temperature of the known aggregate is controlled to be equal to the temperature of the asphalt to be tested in the test process;

S115, apparatuses are adjusted and tested, where a contact angle instrument and a matched software system are started, a needle tube of a liquid dropper is adjusted to a proper position, so as to drip liquid in a center of a field of view of a high-power camera; a knob at an upper part of the liquid dropper is rotated to drip a drop of liquid on a stage, and brightness of a light source, a position of the stage and a focal length of the high-power camera are adjusted to obtain the highest definition of a collected liquid contour image; and finally, clean and dry cloth is used to wipe the liquid drop from the stage, and the stage is lowered;

S116, a test is started, where the asphalt sample to be tested is taken out from the oven, and quickly placed at the liquid dropper of the contact angle instrument, meanwhile, the small aggregate stone chip is placed on the stage, a piston handle of the injector is slowly pushed to drip the asphalt to be tested to the surface of aggregate, under the conditions that a liquid drop contour image is in the center of the field of view of the high-power camera, a shape is clear, and a liquid drop contour is obvious, the image is quickly collected, and if not, the test is abandoned, and restarted; and S117, a result is analyzed, solid-liquid contact angle analysis is carried out by means of the matched software system to obtain contact angles, a mean value of a left contact angle and a right contact angle of the liquid drop contour image is taken as a test result of each time, three times of parallel tests are carried out on each aggregate, and a mean value is taken as a final result.

Figure 6:
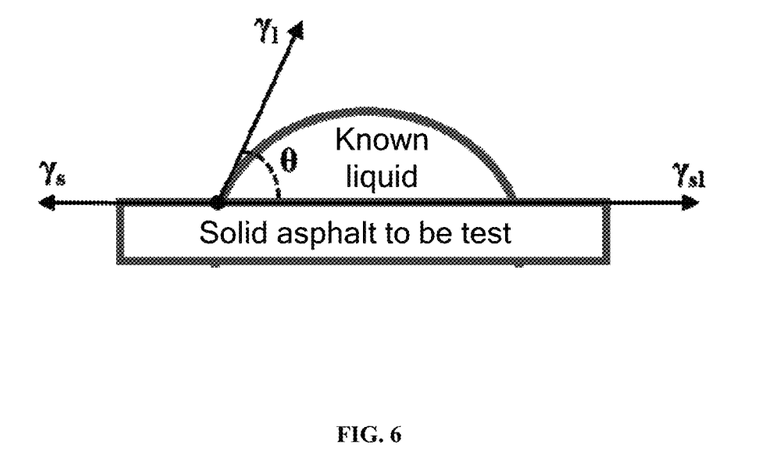
FIG. 6 is a schematic diagram of a test of a surface energy parameter of solid asphalt in the method for determining a mixing temperature of an asphalt mixture based on a surface energy theory provided in some embodiments of the present disclosure.
Figure 7:
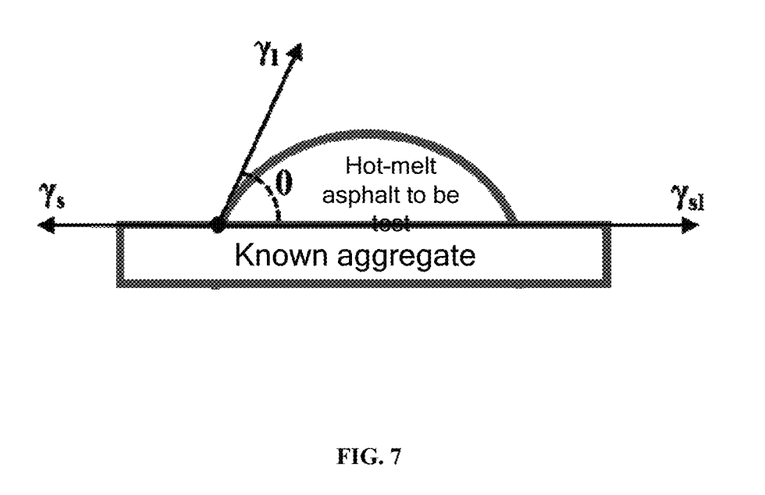
FIG. 7 is a schematic diagram of a test of a surface energy parameter of hot-melt asphalt in the method for determining a mixing temperature of an asphalt mixture based on a surface energy theory provided in some embodiments of the present disclosure.

FIGS. 6 and 7 of this embodiment show a schematic diagram of a basic principle of a test method of the surface energy parameter of the asphalt material in different phase states.

The thickness of the small stone in S111 may be controlled between 2 mm and 4 mm; in S112, 240-mesh waterproof abrasive paper may be used; the injector in S114 may be made of high temperature resistant glass; a lowered distance of the stage in S115 may be the thickness of the small stone; for preventing the asphalt sample and the known aggregate from being cooled excessively, the test process in S116 may not be longer than 10 s in total, otherwise, the test may be abandoned, and restarted; in S117, the contact angle may be obtained through a tangent method; the three known aggregates may be limestone, basalt and granite; and a temperature gradient in a specific experiment for obtaining the contact angles between the hot-melt asphalt to be tested and the known aggregates may be 20° C.

Figure 8:
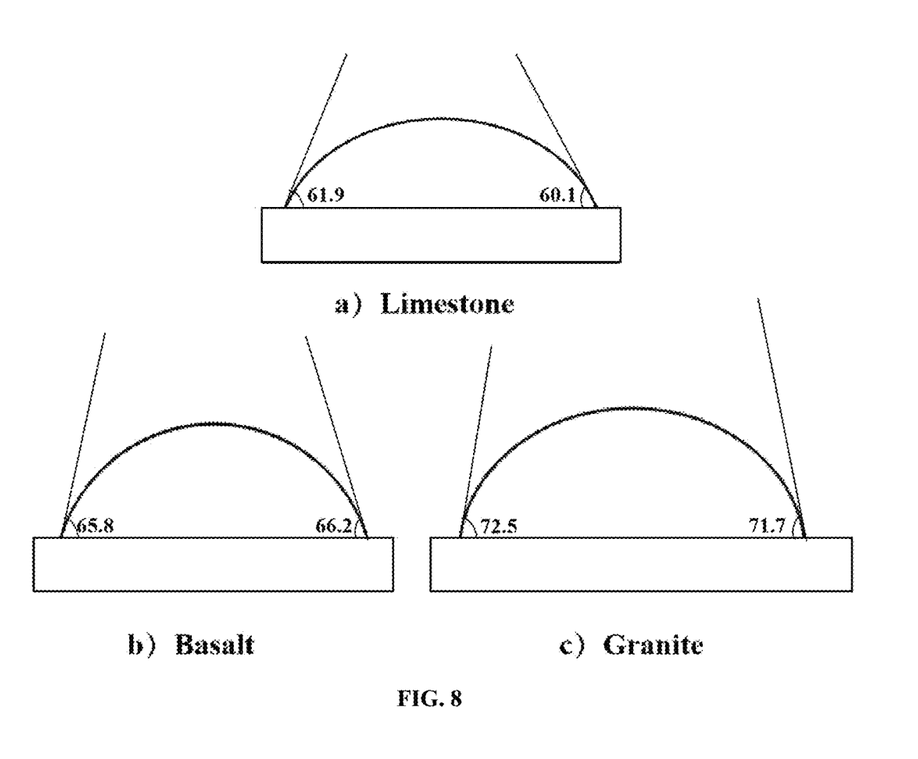
FIG. 8 is a schematic diagram of contact angles (125° C.) between three aggregates and the asphalt 70# in the test method of a surface energy parameter of hot-melt asphalt in the method for determining a mixing temperature of an asphalt mixture based on a surface energy theory provided in some embodiments of the present disclosure.

According to a test result of surface energy of hot-melt asphalt in a specific embodiment, a temperature gradient of a test is determined to be 20° C., and test temperature intervals of matrix asphalt 70# and SBS-modified asphalt are 125-185° C. and 145-205° C. respectively; for preventing the hot-melt asphalt and the aggregate from being cooled excessively, after a liquid drop is stabilized, image is immediately acquired, so as to obtain a contact angle, a continuous time interval from taking an asphalt sample out of an oven to carrying out test contact is not longer than 10 s; and at 125° C., the contact images of the matrix asphalt 70# and the surfaces of the three aggregates are acquired as shown in FIG. 8.

The obtained contact angles of the hot-melt asphalt and the surfaces of different aggregates are as shown in Table 3.

TABLE 3

Contact angles of hot-melt asphalt and surfaces of different aggregates

| Asphalt type | Temperature/ ° C. | Contact angle/° | | | | | |
|---|---|---|---|---|---|---|---|
| | | Limestone | | Basalt | | Granite | |
| 70# | 125 | 60.8 | 61.2 | 65.3 | 65.5 | 71.4 | 71.4 |
| | | 61.4 | | 65.1 | | 72.1 | |
| | | 61.5 | | 66.0 | | 70.8 | |
| | 145 | 35.6 | 36.1 | 50.1 | 50.3 | 58.9 | 58.9 |
| | | 36.9 | | 49.7 | | 59.4 | |
| | | 35.7 | | 51.0 | | 58.4 | |
| | 165 | 23.4 | 22.8 | 41.5 | 41.5 | 47.4 | 47.4 |
| | | 22.2 | | 40.9 | | 47.8 | |
| | | 22.7 | | 42.1 | | 46.9 | |
| | 185 | 21.2 | 20.8 | 31.2 | 31.3 | 33.1 | 33.5 |
| | | 20.4 | | 30.7 | | 34.0 | |
| | | 20.9 | | 31.9 | | 33.4 | |
| SBS | 145 | 55.4 | 55.4 | 61.5 | 61.0 | 66.6 | 66.6 |
| | | 54.9 | | 60.5 | | 67.1 | |
| | | 56.0 | | 60.9 | | 66.2 | |
| | 165 | 33.2 | 33.2 | 48.7 | 48.8 | 56.4 | 56.3 |
| | | 32.9 | | 48.4 | | 56.7 | |
| | | 33.4 | | 49.3 | | 55.9 | |
| | 185 | 22.0 | 21.6 | 40.1 | 40.5 | 44.8 | 44.4 |
| | | 21.1 | | 41.0 | | 43.9 | |
| | | 21.8 | | 40.5 | | 44.5 | |
| | 205 | 19.5 | 19.2 | 26.9 | 27.1 | 32.1 | 31.8 |
| | | 19.3 | | 26.7 | | 31.4 | |
| | | 18.9 | | 27.6 | | 31.9 | |

Figure 9:
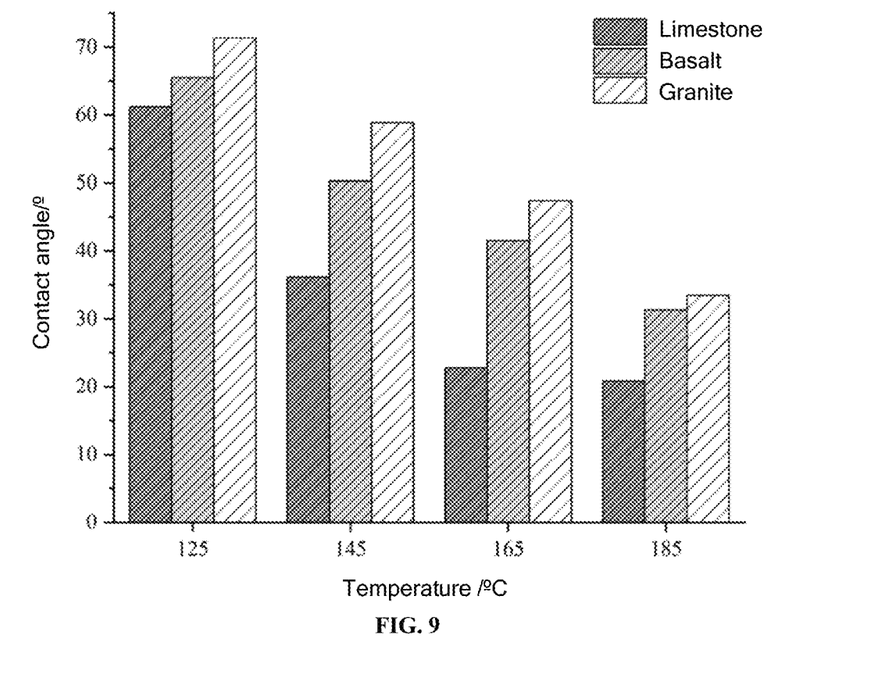
FIG. 9 is a schematic diagram of changes of the contact angles between the asphalt 70# and different aggregates with temperature in the test method of a surface energy parameter of hot-melt asphalt in the method for determining a mixing temperature of an asphalt mixture based on a surface energy theory provided in some embodiments of the present disclosure.
Figure 10:
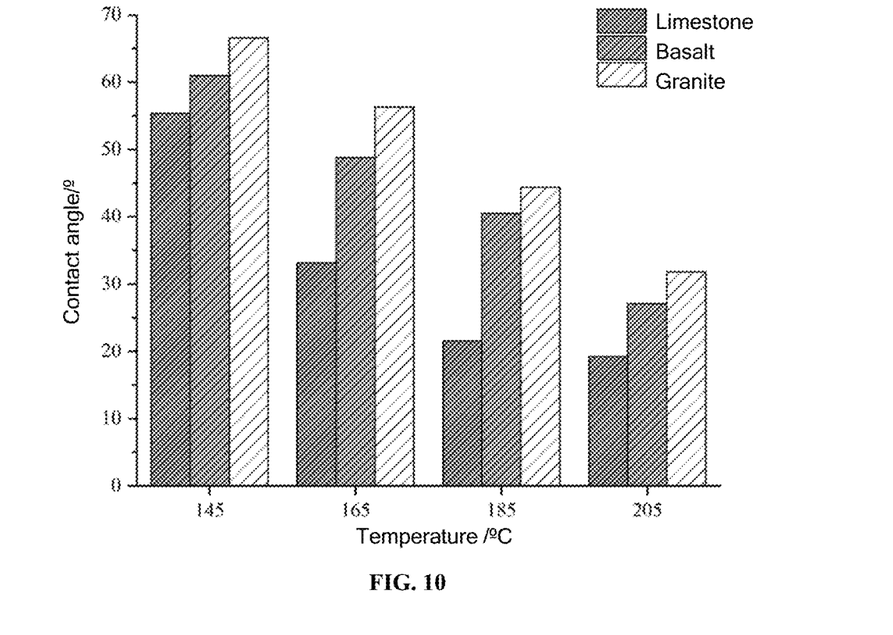
FIG. 10 is a schematic diagram of changes of the contact angles between the SBS-modified asphalt and different aggregates with temperature in the test method of a surface energy parameter of hot-melt asphalt in the method for determining a mixing temperature of an asphalt mixture based on a surface energy theory provided in some embodiments of the present disclosure.

For more intuitive comparison, the test results of the contact angles in the above table are plotted as bar graphs, as shown in FIGS. 9 and 10.

The test results of the contact angles of the hot-melt asphalt and the surfaces of the different aggregates show that the contact angle of the asphalt and the aggregate is gradually reduced along with temperature rise, which means that the temperature rise and increase of the fluidity of the hot asphalt favorably improve a wetting effect of the asphalt on the surface of the aggregate; and at the same temperature, the contact angles of the hot-melt asphalt and the surfaces of the aggregates are as follows: limestone<basalt<granite, which is consistent with the order of adhesion of three aggregates: limestone>basalt>granite.

Calculating and solving are further carried out according to the contact angle data in Table 3 to obtain surface energy parameters of the hot-melt asphalt under different temperature conditions as shown in Table 4.

TABLE 4

Test results of surface energy parameters of hot-melt asphalt

| Asphalt type | Temperature/ °C. | $\gamma$/mJ · $m^{-2}$ | $\gamma^{LW}$/mJ · $m^{-2}$ | $\gamma^{AB}$/mJ · $m^{-2}$ |
|---|---|---|---|---|
| 70# | 125 | 20.514 | 18.992 | 1.522 |
|  | 145 | 19.007 | 17.879 | 1.128 |
|  | 165 | 18.294 | 17.095 | 1.199 |
|  | 185 | 16.578 | 15.904 | 0.674 |
| SBS | 145 | 20.415 | 18.549 | 1.866 |
|  | 165 | 18.957 | 18.007 | 0.95 |
|  | 185 | 17.221 | 16.98 | 0.241 |
|  | 205 | 17.199 | 16.999 | 0.2 |

Effectiveness of the test result in Table 4 is verified according to a linear relation between a product $\gamma_l \cos \theta$ of surface energy $\gamma_l$ of liquid and the cosine of a solid-liquid contact angle $\theta$ and $\gamma_l$, that is, a linear correlation $R^2$ between the product $\gamma_l \cos \theta$ of the surface energy $\gamma_l$ of the hot-melt asphalt and the cosine of a contact angle of a surface of a specific aggregate at different temperatures and $\gamma_l$ is verified, and the result is as shown in Table 5.

TABLE 5

Linear correlation $R^2$ of $\gamma_l \cos\theta$ and $\gamma_l$

| Asphalt | Aggregate | | |
|---|---|---|---|
|  | Limestone | Basalt | Granite |
| 70# | 0.9002 | 0.9707 | 0.9979 |
| SBS | 0.9908 | 0.9594 | 0.9535 |

Inspection results in Table 5 show that the linear correlation $R^2$ of the product $\gamma l \cos \theta$ of the surface energy $\gamma l$ of the hot-melt asphalt and the cosine of the contact angle of the surface of the specific aggregate at different temperatures and $\gamma l$ is 0.9 or above, which indicates that the linear correlation of $\gamma l \cos \theta$ and the $\gamma l$ is good, that is, the test result of the surface energy of the hot-melt asphalt in Table 5 is reliable.

Although the present disclosure has been described in detail above with a general description and specific embodiments, some modifications or improvements can be made on the basis of the present disclosure, which is apparent to those skilled in the art. Therefore, all these modifications or improvements made without departing from the spirit of the present disclosure fall within the scope of the present disclosure.

As used herein, the terms such as "upper", "lower", "left", "right" and "middle" are merely employed for ease of description, and not intended to limit the applicable scope of the present disclosure, and the change or adjustment of the relative relations shall be deemed as falling within the applicable scope of the present disclosure without substantial alteration of technical contents.

What is claimed is:

1. A method for determining a mixing temperature of an asphalt mixture, the method comprising the following steps:
   S100, obtaining a test result of surface energy of a hot-melt asphalt;
   S200, obtaining a total adhesion work of an asphalt and an aggregate interface in the asphalt mixture at different mixing temperatures according to a calculation formula for the total adhesion work in combination with the test result of the surface energy of the hot-melt asphalt;
   S300, determining a temperature range corresponding to peak values of the total adhesion work of the asphalt and the aggregate interface; and
   S400, calculating a median value of the temperature range determined in S300, so as to determine an optimum mixing temperature of the asphalt mixture;
   wherein the obtaining the test result in S100 comprises the following steps:
   S110, obtaining a contact angle between the hot-melt asphalt to be tested and each of three known aggregates; and
   S120, solving a predetermined linear equation set to obtain the surface energy of the hot-melt asphalt;
   wherein step S110 for obtaining a contact angle between the hot-melt asphalt to be tested and each of three known aggregates specifically comprises:
   S111, selecting and conveying a coarse aggregate with known surface energy and a regular shape to a stone cutting facility, carrying out double-side cutting on a stone by using a water saw to obtain a small stone with a flat surface, and controlling a thickness of the small stone;
   S112, washing the cut small stone with clear water, and airing and polishing the small stone with waterproof abrasive paper to obtain a flat and smooth surface;
   S113, soaking the stone with distilled water for a first predetermined duration, and repeatedly washing the small stone 2-3 times to remove stains on the surface and in micropores of the stone; and drying the stone into a drying oven, and cooling the stone to a room temperature in a dry environment to obtain a dry, clean and flat-surfaced small stone chip sample;
   S114, heating the asphalt to be tested to a hot melt state, using an injector to suck a predetermined amount of the asphalt to be tested, and using cloth to wipe the asphalt from an injection suction nozzle and a pipe wall; and carrying out heat preservation on the asphalt sample and the known aggregate for a second predetermined duration according to a temperature required by a test in a clean oven with accurate temperature control;
   S115, starting a contact angle instrument and a matched software system, adjusting a needle tube of a liquid dropper to a proper position, so as to drip liquid in a center of a field of view of a high-power camera; rotating a knob at an upper part of the liquid dropper to drip a drop of liquid onto a stage, and adjusting brightness of a light source, a position of the stage and a focal length of the high-power camera to obtain the highest definition of a collected liquid contour image; and finally, using clean and dry cloth to wipe the liquid drop from the stage, and lowering the stage;
   S116, taking out the asphalt sample to be tested from the oven, immediately placing the asphalt sample at the liquid dropper of the contact angle instrument, meanwhile, placing the small aggregate stone chip on the stage, slowly pushing a piston handle of the injector to drip the asphalt to be tested to the surface of aggregate, under the conditions that a liquid drop contour image is in the center of the field of view of the high-power camera, a shape is clear, and a liquid drop contour is obvious, quickly collecting the image, and if not, abandoning the test, and restarting; and
   S117, carrying out solid-liquid contact angle analysis by means of the matched software system to obtain contact angles, taking a mean value of a left contact angle and a right contact angle of the liquid drop contour image as a test result of each time, carrying out three times of parallel tests on each aggregate, and taking a mean value as a final result.

2. The method according to claim 1, wherein the thickness of the small stone in S111 is controlled between 2 mm and 4 mm.

3. The method according to claim 1, wherein 240-mesh waterproof abrasive paper is used in S112.

4. The method according to claim 1, wherein the injector in S114 is made of high temperature resistant glass.

5. The method according to claim 1, wherein a lowered distance of the stage in S115 is the thickness of the small stone.

6. The method according to claim 1, wherein the test process in S116 is not longer than 10 s in total; otherwise, the test is abandoned, and need to be restarted.

7. The method according to claim 1, wherein in S117, the contact angle is obtained through a tangent method.

8. The method according to claim 1, wherein the three known aggregates are limestone, basalt and granite, and a temperature gradient in a specific experiment for obtaining the contact angles between the hot-melt asphalt to be tested and the known aggregates is 20° C.

9. The method according to claim 1, wherein the predetermined linear equation set is expressed as $$\begin{bmatrix} \sqrt{\gamma_{s_1}^{LW}} & \sqrt{\gamma_{s_1}^+} & \sqrt{\gamma_{s_1}^-} \\ \sqrt{\gamma_{s_2}^{LW}} & \sqrt{\gamma_{s_2}^+} & \sqrt{\gamma_{s_2}^-} \\ \sqrt{\gamma_{s_3}^{LW}} & \sqrt{\gamma_{s_3}^+} & \sqrt{\gamma_{s_3}^-} \end{bmatrix} \begin{bmatrix} \sqrt{\gamma_a^{LW}} \\ \sqrt{\gamma_a^-} \\ \sqrt{\gamma_a^+} \end{bmatrix} = \begin{bmatrix} \frac{\gamma_a(1+\cos\theta_1)}{2} \\ \frac{\gamma_a(1+\cos\theta_2)}{2} \\ \frac{\gamma_a(1+\cos\theta_3)}{2} \end{bmatrix}$$

$$\gamma_a = \gamma_a^{LW} + 2\sqrt{\gamma_a^+ \gamma_a^-}$$

wherein $\gamma_s$ and $\gamma_l$ represent surface energy of solid and surface energy of liquid respectively, in unit of mJ·m$^{-2}$; $\gamma_{sl}$ represents solid-liquid interfacial energy, in unit of mJ·m$^{-2}$; s represents the known aggregate; a represents the hot-melt asphalt to be tested; θ represents the contact angle between the hot-melt asphalt to be tested and the known aggregate; and 1, 2, 3 represent the three known aggregates respectively.

10. The method according to claim 1, wherein the first predetermined duration is 5 hours.

11. The method according to claim 1, wherein the second predetermined duration is 2 hours.

12. The method according to claim 1, wherein the drying oven is operated at 175° C. for 5 hours for drying the stone.

* * * * *